United States Patent [19]

Patton, Jr. et al.

[11] 4,424,288

[45] Jan. 3, 1984

[54] CARBODIIMIDE-MODIFIED POLYMETHYLENE POLYPHENYLENE POLYISOCYANATES FOR USE IN THE PREPARATION OF POLYISOCYANURATE-POLYURETHANE FOAMS

[75] Inventors: John T. Patton, Jr., Wyandotte; Peter T. Kan, Plymouth; Thirumurti Narayan, Grosse Ile, all of Mich.

[73] Assignee: BASF Wyandotte Corporation, Wyandotte, Mich.

[21] Appl. No.: 334,158

[22] Filed: Dec. 24, 1981

[51] Int. Cl.³ ..................... C08G 18/14; C08G 18/78
[52] U.S. Cl. ..................... 521/99; 521/124; 521/125; 521/128; 521/129; 521/160; 521/162; 521/901; 521/902; 260/453 AM
[58] Field of Search ............ 260/453 AM; 521/99, 521/124, 125, 128, 129, 160, 162, 901, 902

[56] References Cited

U.S. PATENT DOCUMENTS

| | | | |
|---|---|---|---|
| 3,657,161 | 4/1972 | Bernard et al. | 260/2.5 AW |
| 4,088,665 | 5/1978 | Findeisen et al. | 260/453 AM |
| 4,120,884 | 10/1978 | Woerner et al. | 260/453 SP |
| 4,143,063 | 3/1979 | Alberino et al. | 260/453 SP |
| 4,228,095 | 10/1980 | Narayan | 260/453 AM |

*Primary Examiner*—Dolph H. Torrence
*Attorney, Agent, or Firm*—Norbert M. Lisicki

[57] ABSTRACT

Liquid carbodiimide-modified organic polyisocyanates are prepared by reacting a crude polymethylene polyphenylene polyisocyanate containing no more than 70 weight percent diphenylmethane diisocyanate with an isomer mixture of 40 to 100 weight percent 4,4'-, 0 to 50 weight percent 2,4- and 0 to 10 weight percent 2,2'-diphenylmethane diisocyanate and having an average functionality of 2.1 to 2.7 and a free NCO content of at least 30 percent weight percent in the presence of an effective amount of carbodimidization catalyst. Polyisocyanurate-polyurethane foams prepared by reacting the modified polyisocyanates and polyols selected from the group consisting of diethylene glycol and ethylene oxide adducts of trimethylolpropane, trimethylolethane, glycerine, pentaerythritol, α-methylglucoside, sucrose, toluene diamine and methylene dianiline in the presence of trimerization catalysts exhibit improved compression strengths and K-factors with low friability and smoke density.

1 Claim, No Drawings

CARBODIIMIDE-MODIFIED POLYMETHYLENE POLYPHENYLENE POLYISOCYANATES FOR USE IN THE PREPARATION OF POLYISOCYANURATE-POLYURETHANE FOAMS

BACKGROUND OF THE INVENTION

1. Field of the Invention

The present invention concerns carbodiimide-modified organic polyisocyanates. More particularly, the present invention relates to liquid carbodiimide-modified polymethylene polyphenylene polyisocyanates and to polyisocyanurate-polyurethane foams prepared therefrom.

2. Prior Art

The prior art discloses a number of patents for the conversion of polyisocyanates containing carbodiimide groups employing various catalysts, among which, as disclosed in U.S. Pat. No. 4,085,140, is a co-catalyst system of cyclic phosphorus compounds and a tertiary amine. Another U.S. Pat. No. 3,640,966 discloses the preparation of polyisocyanates containing carbodiimide linkages by employing catalytic amounts of a catalyst which is an organic isocyanate compound containing biuret, urea, amido, isocyanurate, uretedione, or uretonimine groups in the compound.

Still another patent, U.S. Pat. No. 3,670,502, claims a process for the preparation of carbodiimide-containing organic polyisocyanate by employing catalytic amounts of tris(chloromethyl)phosphine oxide. U.S. Pat. No. 3,449,256 claims the preparation of carbodiimide-modified polyisocyanates by heating the polyisocyanate with trihydrocarbyl phosphate.

U.S. Pat. No. 3,426,025 teaches a process for the preparation of organic carbodiimide-modified polyisocyanates by the use of a metallic derivative of an organic hydroxy compound which metal may be lithium, sodium, potassium, boron, titanium, hafnium, zirconium, niobium and silicon. U.S. Pat. No. 4,085,140 discloses a process for the conversion of isocyanate groups to carbodiimide groups employing a co-catalyst system. U.S. Pat. No. 4,031,026 teaches a diphenylmethane diisocyanate composition which comprises diphenylmethane diisocyanate, a diphenylmethane diisocyanate uretonimine group containing derivative, a reaction product of MDI of the diphenylmethane diisocyanate and a diol, and methylene bridged polyphenylene polyisocyanate. U.S. Pat. No. 3,657,161 claims a polycarbodiimide polyisocyanurate foam and a process for preparing the same which comprises polymerizing an organic polyisocyanate in the presence of a blowing agent, a catalyst which promotes the formation of carbodiimide groups and a catalyst which promotes the simultaneous formation of isocyanurate groups. U.S. Pat. No. 4,085,140 teaches the preparation of carbodiimide-containing polyisocyanates suitable for the preparation of microcellular foams or elastomers. U.S. Pat. No. 4,284,730 teaches stable carbodiimide and uretonimine, isocyanurate containing polyisocyanates, the process for their preparation and to microcellular foams prepared therefrom.

SUMMARY OF THE INVENTION

Liquid carbodiimide modified organic polyisocyanates are prepared by partially reacting a crude polymethylene polyphenylene polyisocyanate containing no more than 70 percent diphenylmethane diisocyanate and having an average functionality of about 2.1 to 2.7 and a free NCO content of at least 30 weight percent in the presence of an effective amount of a carbodiimidization catalyst. The reaction proceeds to the extent that the polyisocyanate has a viscosity of no greater than about 3000 cps at 25° C. and a free NCO content range of from 25.0 to 31.0 percent. Polyisocyanurate-polyurethane foams having improved physical properties are prepared from these polyisocyanates. The foams of the present invention display enhanced compression strength and K-factors with lowered friability and low smoke density as compared to the prior art.

DESCRIPTION OF THE PREFERRED EMBODIMENTS

In accordance with the present invention, carbodiimide-modified organic polyisocyanates useful for the preparation of polyisocyanurate-polyurethane foam products and the like are prepared by heating a crude polymethylene polyphenylene polyisocyanate containing no more than 70 percent by weight diphenylmethane diisocyanate with an isomer mixture of 40 to 100 weight percent 4,4'-, 0 to 50 weight percent 2,4- and 0 to 10 weight percent 2,2'-diphenylmethane diisocyanate and having an average functionality ranging from about 2.1 to 2.7, a free NCO content of at least 30 percent in the presence of a catalytically effective amount of a carbodiimidization catalyst. The reaction proceeds to the extent that the polyisocyanate has a viscosity of no greater than about 3000 cps at 25° C. and a free NCO content range of from 25.0 to 31.0 percent. The catalyst is generally employed at a concentration ranging from 0.001 part to 5.0 parts per 100 parts of organic polyisocyanates. Preferably, the catalyst is employed at a concentration ranging from 0.001 to 1 part per 100 parts of the polyisocyanate. The temperatures employed are those over 30° C. Generally, the range is 50° to 250° C., preferably from about 50° to 120° C. and 200° to 230° C. The time required for carrying out this reaction is dependent upon the quantity of catalyst employed. However, the time can vary from about 0.5 hour to 6 hours. When the catalyst is employed in the preferred amount, the reaction time ranges from 0.5 hour to 4 hours. After the required reaction time period has elapsed the resulting product is cooled to temperatures less than 30° C. Optionally, the reaction product may be treated at the reaction temperature or lower with catalyst deactivators which include salts such as magnesium chloride dihydrate, acid chlorides such as benzoyl chlorides and acetyl chlorides, acids such as hydrochloric acid, oxalic acid, phosphoric acid, benzenesulfonic acid, toluenesulfonic acid, methanesulfonic acid or trifluoromethanesulfonic acid, sulfonyl chlorides such as benzenesulfonyl chloride, toluenesulfonyl chloride and the like. Other deactivators which may be employed are such agents as dimethylsulfate, alkyl o,p-toluenesulfonates, methyl chloride and similar compounds as disclosed in U.S. Pat. No. 3,769,318.

In the presence of excess polyisocyanate, the carbodiimide and uretonimine structure exists in equilibrium as shown below.

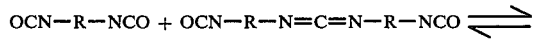

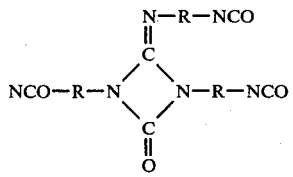

The carbodiimide-modified organic polyisocyanates of the present invention are useful in the preparation of rigid or flexible polyisocyanurate-polyurethane foams. The rigid or flexible polyurethane foams in accordance herewith are prepared by reacting the carbodiimide-modified organic polyisocyanate and an active hydrogen-containing compound in the presence of trimerization catalysts as are well known to those skilled in the art. The foams prepared accordingly display improved properties over those obtained when employing modified polyisocyanates of the prior art or the polyisocyanates of commerce.

The polyisocyanate compositions of the instant invention may be prepared by employing well-known carbodiimide-promoting compounds as catalysts. The carbodiimide catalysts employed in accordance with the invention can be any of those known in the art as being useful in the conversion of an isocyanate to the corresponding carbodiimide. Illustrative of such catalysts are:

(a) phospholene 1-oxides and 1-sulfides having the formulae:

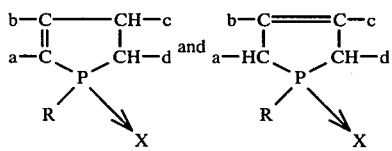

wherein a, b, c and d are each selected from the group consisting of hydrogen and hydrocarbyl from 1 to 12 carbon atoms inclusive, R is selected from the group consisting of lower alkyl and aryl and X is selected from the group consisting of oxygen and sulfur. The above phospholene compounds and methods for their preparation are described in U.S. Pat. Nos. 2,663,737; 2,663,738; and 2,853,473. The 3-phospholenes can be isomerized readily to the corresponding 2-phospholenes by thermal-treatment or by refluxing with an aqueous based as disclosed by Quinn et al, *Journal American Chemical Society*, 33, 1024, 1968. Representative compounds within the above class are 1-phenyl-2-phospholene-1-oxide; 3-methyl-1-phenyl-3-phospholene-1-oxide; 3-methyl-1-phenyl-2-phospholene-1-oxide; 1-phenyl-2-phospholene-1-sulfide; 1-ethyl-2-phospholene-1-oxide; 1-ethyl-3-methyl-2-phospholene-1-oxide; 1-ethyl-3-methyl-2-phospholene-1-sulfide; and the isomeric phospholanes corresponding to the above-named compounds. Also, polymer bound phospholene oxide may be employed specifically those having recurring units, for example,

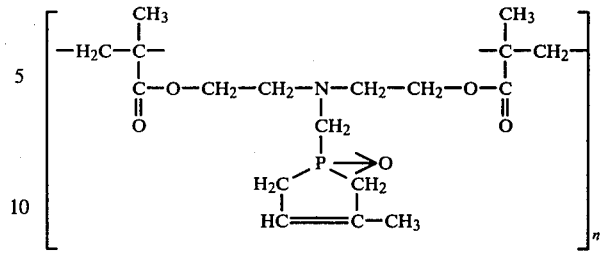

as disclosed in U.S. Pat. No. 4,105,643, and those of the following structure as disclosed in U.S. Pat. No. 4,105,642.

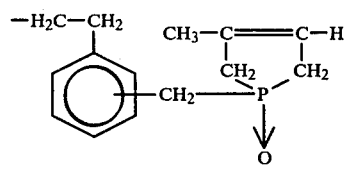

(b) diaza- and oxaza-phospholanes and -phosphorinanes

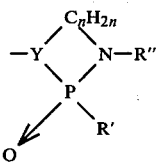

wherein $C_nH_{2n}$ represents alkylene from 1 to 12 carbon atoms, inclusive, at least one and not more than three adjacent carbon atoms and said alkylene radical forming a chain, one end of which is attached to Y, the other end of which is attached to N, thereby completing the heterocyclic ring; R' is selected from the group consisting of hydrocarbyl containing 1 to 12 carbon atoms, inclusive; and halo, nitro, alkoxy, alkyl, mercapto, and cyano-substituted hydrocarbyl from 1 to 12 carbon atoms, inclusive; R" is hydrocarbyl containing from 1 to 12 carbon atoms, inclusive, and Y is selected from the group consisting of —O— and —NR"— wherein R" has the significance as defined above. The above compounds and methods for their preparation are described in U.S. Pat. No. 3,522,303. Representative examples of such compounds are: 2-ethyl-1,3-dimethyl-1,3,2-diazaphospholane-2-oxide; 2-chloromethyl-1,3-dimethyl-1,3,2-diazaphospholane-2-oxide; 2-trichloromethyl-1,3-dimethyl-1,3,2-diazaphospholane-2-oxide; 2-phenyl-1,3-dimethyl-1,3,2-diazaphospholane-2-oxide; 2-phenyl-1,3-dimethyl-1,3,2-diaza-phosphorinane-2-oxide; 2-benzyl-1,3-dimethyl-1,3,2-diazaphospholane-2-oxide; 2-allyl-1,3-dimethyl-1,3,2-diazaphospholane-2-oxide; 2-bromomethyl-1,3-dimethyl-1,3,2-diazaphospholane-2-oxide; 2-cyclohexyl-1,3-dimethyl-1,3,2-diazaphospholane-2-oxide; 2-(2-ethoxyethyl)-1,3-dimethyl-1,3,2-diazaphospholane-2-oxide; and 2-naphthyl-1,3-dimethyl-1,3,2-diazaphospholane-2-oxide.

(c) Triaryl arsines wherein the aryl groups are free from substituents containing reactive hydrogen atoms, said arsine being represented by the formula:

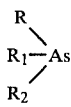

wherein each of R, $R_1$ and $R_2$ represents the same or different aryl moieties having from 6 to 12 carbon atoms, inclusive. Such compounds are described in U.S. Pat. No. 3,406,198. Representative examples are: triphenylarsine, tris(p-tolyl)arsine, tris(p-methoxyphenyl)arsine, tris(p-ethoxyphenyl)arsine, tris(p-chlorophenyl)arsine, tris(p-fluorophenyl)arsine, tris(2,5-xylyl)arsine, tris(p-cyanophenyl)arsine, tris(1-naphthyl)arsine, tris(p-methylmercaptophenyl)arsine, tris(p-biphenylyl)arsine, p-chlorophenylbis-(p-tolyl)arsine and phenyl(p-chlorophenyl)(p-bromophenyl)-arsine.

(d) Also included are compounds of the formula:

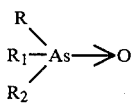

wherein each R, $R_1$ and $R_2$ represents the same or different alkyl or aryl groups having from 6 to 12 carbon atoms, inclusive. Representative examples of such are: triphenylarsine oxide, triethylarsine oxide, and polymer bound arsine oxide such as are described in U.S. Pat. No. 4,143,063:

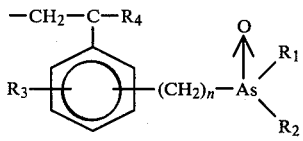

wherein $R_1$ and $R_2$ are hydrocarbyl from 1 to 12 carbon atoms inclusive, $R_3$ is hydrogen, chloro or methyl, $R_4$ is hydrogen or methyl, and n is 0 or 1.

(e) Metallic derivatives of acetylacetone such as the beryllium, aluminum, zirconium, chromium, and iron derivatives thereof as disclosed in U.S. Pat. No. 3,152,131.

(f) Phosphate esters of the formula:

$$(RO)_3PO$$

wherein R is hydrocarbyl from 1 to 12 carbon atoms, inclusive. Such esters and methods for their preparation are disclosed in U.S. Pat. No. 3,056,835. Representative examples are trimethylphosphate, triethylphosphate, ethyldipropylphosphate, triisopropylphosphate, triallylphosphate, triphenylphosphate, and tricresylphosphate.

(g) Phosphine oxides of the formula:

$$R_3PO$$

wherein R is hydrocarbyl from 1 to 12 carbon atoms, inclusive. Representative examples are triethylphosphine oxide, tributylphosphine oxide, triphenylphosphine oxide, and tris(chloromethyl)phosphine oxide.

(h) Metal complexes derived from a d-group transition element and π-bonding ligand selected from the group consisting of carbon monoxide, nitric oxide, hydrocarbylisocyanides, trihydrocarbylphosphine, trihydrocarbylarsine, trihydrocarbylstilbine, and dihydrocarbylsulfide wherein hydrocarbyl in each instance contains from 1 to 12 carbon atoms, inclusive, provided that at least one of the π-bonding ligands in the complex is carbon monoxide or hydrocarbylisocyanide. Such complexes and methods for the preparation are disclosed in U.S. Pat. No. 3,406,197. Representative examples of such complexes are iron pentacarbonyl, di-iron pentacarbonyl, tungsten hexacarbonyl, molybdenum hexacarbonyl, chromium hexacarbonyl, dimanganese decacarbonyl, nickel tetracarbonyl, ruthenium pentacarbonyl, and the complex of iron tetracarbonyl:methylisocyanide.

The term "hydrocarbyl" from 1 to 12 carbon atoms inclusive employed herein means the monovalent radical obtained by removing one hydrogen atom from a parent hydrocarbon having the stated carbon atom content. Illustrative of such groups are alkyl such as methyl-, ethyl-, propyl-, butyl-, pentyl-, hexyl-, heptyl-, octyl-, nonyl-, decyl-, undecyl-, undodecyl-, including isomeric forms thereof; alkenyl such as allyl, butenyl, pentenyl, hexenyl, heptenyl, octenyl, nonenyl, decenyl, undecenyl, and dodecenyl, including isomeric forms thereof; cycloalkyl such as cyclobutyl, cyclopentyl, cyclohexyl, cycloheptyl, cyclooctyl, and the like; cycloalkenyls such as cyclopentenyl, cyclohexenyl, cycloheptenyl, and the like; aralkyl such as benzyl, phenethyl, phenylpropyl, benzhydryl, naphthylmethyl, and the like; and aryls such as phenyl, tolyl, xylyl, naphthyl, biphenylyl, and the like.

The term "lower alkyl", as used herein, means alkyl from 1 to 6 carbon atoms, inclusive, such a methyl, ethyl, propyl, butyl, pentyl, hexyl and isomeric forms thereof.

The preferred carbodiimide catalysts for use in preparing the compounds of the instant invention are the 3-phospholene oxides. The most preferred carbodiimide catalysts for use in preparing these compounds in accordance with the invention are the 1-aryl-3-lower alkyl-3-phospholene 1-oxide and 1,3-di(lower alkyl)-3-phospholene 1-oxide. The most preferred species are 1-phenyl-3-methyl-3-phospholene 1-oxide and 1-ethyl-3-methyl-3-phospholene-1-oxide, and the tris-(chloromethyl)phosphine oxide. Organotin compounds may also be employed in the present invention.

(i) Organotin compounds.

The organotin compounds which may be employed in the present invention are both quadrivalent and divalent organotin compounds as disclosed in U.S. Pat. No. 4,228,095. The quadrivalent organotin compound may be described by the following formula:

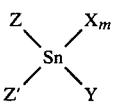

wherein Z and Z' are individually alkyl, aryl, alicyclic, heterocyclic, oxyalkyl or acyloxy group having from 1 to 18 carbon atoms and may be the same or different, X is an alkyl, aryl, alicyclic, heterocyclic, oxyalkyl, acyloxy, thioalkyl or thioalkyklene acyloxy group having 1 to 18 carbon atoms, Y is equal to X or oxy groups or a group represented by the following formula:

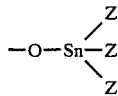

provided that when Y is this group, X is an alkyl or aryl group, m is equal to 1 except when Y is an oxy group then m is equal to 0, and a divalent organotin compound which may be described by the following formula:

$$Sn(OOCZ'')_2$$

wherein Z'' is alkyl, aryl, alicyclic, heterocyclic having from 1 to 18 carbon atoms.

Those quadrivalent organotin compounds which may be employed as described in the formula above, are dibutyltin dilaurate, dibutyltin diacetate, dibutyltin di(2-ethyl-hexanoate), dioctyltin dilaurate, dibutyltin maleate, di(n-octyl)tin maleate, bis(dibutylacetoxytin) oxide, bis(dibutyl-lauroyloxytin) oxide, dibutyltin dibutoxide, dibutyltin dimethoxide, dibutyltin disalicilate, dibutyltin bis(isooctyl-maleate), dibutyltin bis(isopropylmaleate), dibutyltin oxide, tributyltin acetate, tributyltin isopropyl succinate, tributyltin linoleate, tributyltin nicotinate, dimethyltin dilaurate, dimethyltin oxide, dioctyltin oxide, bis(tributyltin) oxide, diphenyltin oxide, triphenyltin acetate, tri-n-propyltin acetate, tri-n-propyltin laurate, and bis(tri-n-propyltin) oxide, dibutyltin dilauryl mercaptide, dibutyltin bis(isooctylmercaptoacetate) and bis(triphenyltin oxide. Those preferred are dibutyltin diacetate, dibutyltin dilaurate, dibutyltin dilaurylmercaptide, dibutyltin bis(isooctylmercaptoacetate), dibutyltin oxide, bis(triphenyltin) oxide, bis(tri-n-butyltin) oxide. Those divalent organotin compounds which may be employed as catalysts as described in the formula above are: stannous oxalate, stannous oleate, stannous naphthenate, stannous acetate, stannous butyrate, stannous 2-ethylhexanoate, stannous laurate, stannous palmitate, and stannous stearate. The preferred divalent tin compounds are stannous oxalate, stannous oleate and stannous 2-ethylhexanoate.

In accordance with the present invention, rigid and flexible and microcellular foams may be prepared by the reaction of the modified organic polyisocyanate with polyols in the presence of trimerization catalysts, blowing agents, surfactants and other additives which may be deemed necessary. Typical polyols which may be employed in the preparation of the foams of the instant invention include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols or diols, ammonia, and amines including aromatic, aliphatic and heterocyclic amines as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 53 to 10,000, preferably from 53 to 1000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α, β-diethylsuccinic acid, isophthalic acid, terphthalic acid, phthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)-propane, commonly known as Bisphenol A.

Any suitable polyoxyalkylene polyether polyol may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetraydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxices and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thils such as 3-hexyne-1,6-dithiol.

Suitable amines which may be condensed with alkylene oxides include aromatic amines such as aniline, o-chloro-aniline, p-aminoaniline, 1,5-diaminonaphthalene, methylene dianiline, the various condensation products of aniline and formaldehyde, and the isomeric diaminotoluenes; aliphatic amines such as methylamine, triisopropanolamine, ethylenediamine, 1,3-diaminopropane, 1,3-diaminobutane, and 1,4-diaminobutane.

The preferred polyols which may be used to prepare the polyisocyanurate-polyurethane foams using the polyisocyanates of the present invention are selected from the group consisting of diethylene glycol and ethylene oxide adducts of trimethylolpropane, trimethylolethane, glycerine, pentarythritol, 2,4-, 2,6-, 2,3-, 3,4-, 2,5-, toluenediamine, 2,4'-, 2,2'-, 4,4'-methylene dianiline, α-methylglycoside and sucrose.

The polyurethane-polyisocyanurate foams of the present invention may also be prepared by the reaction of a graft copolymer polyol with the polyisocyanate of the instant invention in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane products are disclosed in U.S. Pat. Re. No. 24,514 together with suitable machinery to be used in conjunction therewith. For the preparation of microcellular foams, blowing agents are generally not necessary. If desired for more expanded foams, they may be employed. When water is added as the blowing agent, corresponding quantities of excess isocyanate to react with the water and produce carbon dioxide may be used.

It is possible to proceed with the preparation of the polyurethane-polyisocyanurate products by a prepolymer technique wherein an excess of organic polyisocyanate of the instant invention is reacted in a first step with a polyol to prepare a prepolymer having free isocyanate groups which is then reacted in a second step with a polyol or an amine and a blowing agent such as water or a fluorocarbon to prepare a foam. Alternately, the components may be reacted in a single working step commonly known as the "one-shot" technique of preparing polyisocyanurate-polyurethanes products. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Chain-extending agents which may be employed in the preparation of the polyisocyanurate-polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol, and primary and secondary diamines which react more readily with the polyisocyanates of the instant invention than does water. These include phenylenediamine, ethylenediamine, diethylenetriamine, N-(2-hydroxypropyl)-ethylenediamine, N,N'-di(2-hydroxypropyl)ethylenediamine, piperazine, and 2-methyl-piperazine.

Any suitable polyurethane promoting catalyst may be used including tertiary amines such as, for example, triethylenediamine, N-methylmorpholine, N-ethylmorpholine, diethylaminoethanol, N-laurylmorpholine, 1-methyl-4(dimethylaminoethyl) piperazine, 3-methoxy-N,N'-dimethylpropylamine, N,N,N'-trimethyl-isopropylproylenediamine, N,N,N',N''-tetraethylpropylenediamine, dimethylbenzylamine, dimethylcycloheylamiine and the like. Other suitable catalysts are, for example, tin compounds such as stannous chloride, tin salts of carboxylic acids, such as dibutyltin di-2-ethylhexanoate and stannous octoate, as well as other organo metallic compounds such as are disclosed in U.S. Pat. No. 2,846,408. The preferred catalysts for the preparation of polyurethane foams are triethylenediamine, N-methylmorpholine and N-ethylmorpholine and dibutyltin dilaurate.

The trimerization catalysts for the preparation of polyurethane-polyisocyanurate foams from the polyisocyanates of the present invention include metal carboxylates, tertiary amine trimerization catalysts, quaternary ammonium carboxylates, alkali metal alkoxides, alkali metal phenoxides and the like. Representative metal carboxylates are: sodium and potassium formates, acetates, and 2-ethylhexanoates. Preferred tertiary amine catalysts are: 1,3,5-tris(N,N-dimethylaminopropyl)-s-hexahydrotriazine, o- and p-(dimethylaminomethyl)-phenols, 2,4,6-tris(dimethylaminomethyl) phenol. The quaternary ammonium salts include tetramethylammonium formate, acetate, 2-ethylhexanoate and the like. Also employed are the compositions which are the reaction products of (a) tertiary amine, (b) alkylene oxide, and (c) a monocarboxylic acid as disclosed in U.S. Pat. No. 4,148,980 which disclosure is incorporated herein by reference.

If desired, a surface-active agent may be employed. Numerous surface-active agents have been found satisfactory. Nonionic surface-active agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkylsulfonic esters, and alkylarylsulfonic acids.

The following examples illustrate the nature of the invention. All parts are by weight unless otherwise stated.

The following abbreviations are employed in the Examples below:

Polyol A is an ethylene oxide adduct of trimethylolpropane having a hydroxyl number of 561.

Polyol B is an ethylene oxide adduct of trimethylolpropane having a hydroxyl number of 230.

Polyisocyanate A is a polymethylene polyphenylene polyisocyanate having an average functionality of 2.7, a viscosity of 250 cps at 25° C. and a free NCO content of 31.5 percent by weight.

Polyisocyanate B is a polymethylene polyphenylene polyisocyanate having an average functionality of 3.0, a viscosity of 2100 cps at 25° C. and a free NCO content of 29.8 percent by weight.

Polyisocyanate C is a polymethylene polyphenylene polyisocyanate having an average functionality of 2.3, a viscosity of 80 cps at 25° C. and a free NCO content of 31.6 percent by weight.

Catalyst A is tris(chloromethyl)phosphine oxide.

Catalyst B is 1-phenyl-3-methylphospholen-1-oxide.

Catalyst C is a mixture of 0.91 gram of potassium octoate, 0.87 gram of DMP-30 and 8.22 grams of polyethylene glycol 200.

Catalyst D is the mixture of Catalyst C in the ratio of 1:1:8.

Catalyst E is a mixture of 1 gram of furfuryl alcohol, 6 grams of TDH and 0.2 gram of dibutyltin diacetate.

FREON 11A—trichloromonofluoromethane sold by duPont.

DC 193—silicone surfactant sold by Dow Corning.

TDH—1,3,5-tris(N,N-dimethylaminopropyl)-s-hexahydrotriazine.

DMP-30—2,4,6-tris(dimethylaminomethyl)phenol.

EXAMPLES 1–10

A reaction flask fitted with a stirrer, thermometer, inlet for nitrogen gas and a drierite packed tube was charged with 100 grams of crude polymethylene polyphenylene polyisocyanate. The indicated catalyst, at various concentrations, was added and the reaction was allowed to proceed at the various temperatures and times. For Examples 4 and 5 an amount of $MgCl_2.2H_2O$ equivalent to the catalyst concentrations was added to quench the reaction. In other examples, 0.42 weight percent of trifluoromethane sulfonic acid was added. The various parameters and resulting physical properties are listed below in Table I.

TABLE I

| Example | Catalyst Type | Catalyst PBW | Reaction Temp., °C./Time, Hour | % NCO after reaction | Viscosity cps/25° C. |
|---|---|---|---|---|---|
| 1 | A | 0.004 | 230/1.6 | 28.9 | 1,100 |
| 2 | A | 0.008 | 230/1.3 | 27.8 | 5,000 |
| 3 | A | 0.008 | 230/3.3 | 25.9 | 60,000 |
| 4 | A | 0.16 | 100/1.7 | 28.1 | 1,500 |
| 5 | A | 0.20 | 100/3.7 | 26.1 | 23,200 |
| 6 | A | 0.004 | 230/1.6 | 28.8 | 1,300 |
| 7 | A | 0.004 | 230/2.0 | 28.4 | 2,280 |
| 8 | B | 0.0094 | 110/1.4 | 27.5 | 4,600 |
| 9 | B | 0.0094 | 110/1.6 | 27.1 | 7,400 |
| 10 | B | 0.03 | 100/1 | 26.5 | 840 |

EXAMPLES 11–22

The polyisocyanurate-polyurethane foams were prepared employing the indicated products and formulations as shown in Tables II, III and IV. The foams of the present invention display enhanced compression strength and K-factors with lowered friability and smoke density as compared to the commercially available crude polyisocyanate products.

TABLE II

| Example | 11 | 12 | 13 | 14 |
|---|---|---|---|---|
| Formulation | | | | |
| Isocyanate | A,200 | B,200 | Ex6,200 | Ex7,200 |
| FREON 11 A | 50 | 50 | 50 | 50 |
| DC-193 | 2 | 2 | 2 | 2 |
| Catalyst | 10,C | 10,C | 10,D | 10,D |
| Polyol A | 40 | 40 | 40 | 40 |
| Properties | | | | |
| Density, pcf | 1.7 | 1.7 | 1.6 | 1.6 |
| Closed Cell, % Corr. | 101 | 107 | 100 | 99 |
| K-factor | | | | |
| Initial | 0.111 | 0.109 | 0.107 | 0.104 |
| Aged 140° F./10 days | 0.141 | 0.134 | 0.136 | 0.132 |
| Compressive Strength, psi 10% defl. | 27 | 33 | 37 | 36 |
| Friability wt. loss, % | 18 | 10 | 4 | 6 |
| Butler Chimney Test | | | | |
| Wt. retained, % | 87 | 74 | 81 | 84 |
| Flame Ht., inches | 8.5 | 9.8 | 8.3 | 7.1 |
| NBS Smoke Density, Dmax. | 70 | 102 | 54 | 52 |

TABLE III

| Example | 15 | 16 | 17 | 18 |
|---|---|---|---|---|
| Formulation | | | | |
| Isocyanate | A,184.6 | B,184.6 | Ex6,221.5 | Ex7,221.5 |
| FREON 11 A | 40 | 40 | 44.4 | 44.4 |
| DC-193 | 4 | 4 | 4.8 | 4.8 |
| Catalyst | 10,C | 10,C | 10,D | 10,D |
| Diethylene Glycol | 15.4 | 15.4 | 18.5 | 18.5 |
| Properties | | | | |
| Density, pcf | 1.7 | 1.6 | 1.8 | 1.8 |
| Closed Cells, % corr. | 97 | 98 | 98 | 99 |
| K-factor | | | | |
| Initial | 0.120 | 0.113 | 0.105 | 0.104 |
| Aged 140° F./10 days | 0.140 | 0.133 | 0.133 | 0.133 |
| Compressive Strength, psi 10% defl. | 24 | 26 | 37 | 40 |
| Friability wt. loss, % | 20 | 12 | 7 | 8 |
| Butler Chimney Test | | | | |
| Wt. retained, % | 91 | 87 | 92 | 94 |
| Flame Height, inches | 7.6 | 9.8 | 4.3 | 7.1 |
| NBS Smoke Density, Dmax. | 52 | 82 | 48 | 51 |

TABLE IV

| Example | 19 | 20 | 21 | 22 |
|---|---|---|---|---|
| Formulation | | | | |
| Isocyanate | A,200 | B,200 | Ex6,200 | Ex7,200 |
| FREON 11 A | 46 | 46 | 50 | 50 |
| DC-193 | 2 | 2 | 2 | 2 |
| Catalyst E | 7.2 | 7.2 | 7.2 | 7.2 |
| Polyol B | 40 | 40 | 40 | 40 |
| Properties | | | | |
| Density, pcf | 1.7 | 1.7 | 1.7 | 1.7 |
| Closed Cells, % corr. | 99 | 99 | 99 | 101 |
| K-factor | | | | |
| Initial | 0.165 | 0.140 | 0.126 | 0.126 |
| Aged 140° F./10 days | 0.234 | 0.204 | 0.186 | 0.178 |
| Compressive Strength, psi 10% defl. | 23 | 24 | — | — |
| Friability wt. loss, % | 47 | 35 | 17 | 14 |
| Butler Chimney Test | | | | |
| Wt. retained, % | 89 | 87 | 77 | 77 |
| Flame height, inches | 7.5 | 8.0 | 8.3 | 7.5 |
| NBS Smoke Density, Dmax. | 55 | 86 | 53 | 54 |

As opposed to other tables, these K-factors were determined parallel to the rise of the foam.

We claim:

1. A polyisocyanurate-polyurethane foam prepared by reacting (a) a carbodiimide-modified polyisocyanate wherein said polyisocyanate is prepared by partially reacting a crude polymethylene polyphenylene polyisocyanate containing no more than 70 percent diphenylmethane diisocyanate an isomer mixture of 40 to 100 weight percent 4,4'-, 0 to 50 weight percent 2,4'- and 0 to 10 weight percent 2,2'-diphenylmethane diisocyanate having an average functionality of about 2.1 to 2.7, an NCO content of at least 31.5 weight percent in the presence of an effective amount of a carbodiimidization catalyst to a viscosity of about 3000 cps at 25° C. and an NCO content from 25.0 to 31.0 weight percent with (b) a polyol selected from the group consisting of diethylene glycol and ethylene oxide adducts of trimethylolpropane, trimethylolethane, glycerine, pentaerythritol, α-methylglucoside, sucrose, toluene diamine and methylene dianiline in the presence of a trimerization catalyst and a blowing agent.

* * * * *